US011934114B2

(12) United States Patent
Zampell et al.

(10) Patent No.: US 11,934,114 B2
(45) Date of Patent: Mar. 19, 2024

(54) DEVELOPER UNIT SEALS WITH FLUID CHANNELS

(71) Applicant: Hewlett-Packard Development Company, L.P., Spring, TX (US)

(72) Inventors: Jeffrey Zampell, San Diego, CA (US); John W. Godden, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/633,627

(22) PCT Filed: Oct. 8, 2019

(86) PCT No.: PCT/US2019/055171

§ 371 (c)(1),
(2) Date: Feb. 8, 2022

(87) PCT Pub. No.: WO2021/071473

PCT Pub. Date: Apr. 15, 2021

(65) Prior Publication Data

US 2022/0283527 A1 Sep. 8, 2022

(51) Int. Cl.
*G03G 15/08* (2006.01)

(52) U.S. Cl.
CPC ................................ *G03G 15/0898* (2013.01)

(58) Field of Classification Search
CPC ............. G03G 15/0898; G03G 15/087; G03G 15/0817; G03G 15/0877
See application file for complete search history.

(56) References Cited

U.S. PATENT DOCUMENTS

| | | | | |
|---|---|---|---|---|
| 5,539,503 | A | 7/1996 | Johnson | |
| 5,980,032 | A | 11/1999 | Pawlowski et al. | |
| 6,033,064 | A | 3/2000 | Pawlowski et al. | |
| 6,487,383 | B2 | 11/2002 | Buchanan et al. | |
| 6,760,555 | B2 | 7/2004 | Dougherty et al. | |
| 7,623,807 | B2 | 11/2009 | Carter, II et al. | |
| 8,867,966 | B2 | 10/2014 | Acosta et al. | |
| 8,948,649 | B2 | 2/2015 | Mccoy et al. | |
| 9,014,593 | B2 | 4/2015 | Ogata et al. | |
| 10,120,302 | B2 | 11/2018 | Pingel et al. | |
| 2012/0304878 | A1 | 12/2012 | Zhang et al. | |
| 2013/0149002 | A1* | 6/2013 | Karp | G03G 15/0898 399/103 |
| 2014/0029971 | A1 | 1/2014 | Pingel et al. | |
| 2016/0259266 | A1* | 9/2016 | Uno | G03G 15/0812 |
| 2016/0349668 | A1* | 12/2016 | Pingel | G03G 15/10 |

FOREIGN PATENT DOCUMENTS

| | | | |
|---|---|---|---|
| WO | 2018/141370 | A1 | 8/2018 |

* cited by examiner

*Primary Examiner* — Jessica L Eley

(57) ABSTRACT

In one example in accordance with the present disclosure, a developer unit seal is described. The seal includes a first sealing member to contact an end cap of the developer unit. The first sealing member has ports to align with rollers that are to protrude into the end cap. The seal includes a second sealing member to contact the first sealing member. The second sealing member has ports to align with the rollers. Channels are disposed between the first sealing member and the second sealing member to direct print fluid to each of the ports.

14 Claims, 10 Drawing Sheets

DEVELOPER UNIT SEALS WITH FLUID CHANNELS

BACKGROUND

Developer units are used to supply a film of print fluid to a photoelectric imaging surface which then deposits the print fluid on a substrate such as paper. The print fluid supplied by the developer unit is pressurized and the developer unit may be sealed to prevent fluid leakage.

BRIEF DESCRIPTION OF THE DRAWINGS

The accompanying drawings illustrate various examples of the principles described herein and are part of the specification. The illustrated examples are given merely for illustration, and do not limit the scope of the claims.

Figure 1:
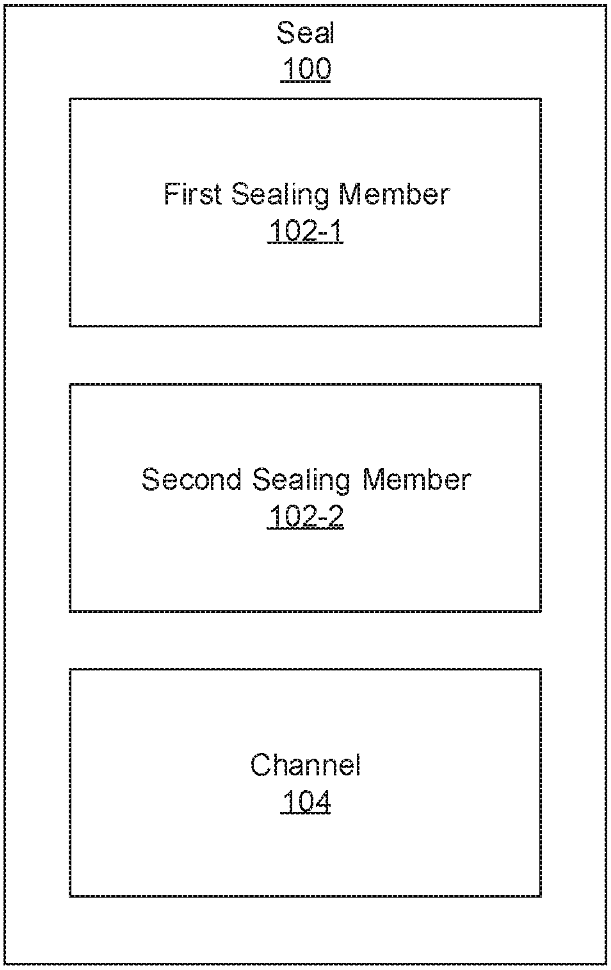
FIG. 1 is a block diagram of a developer unit seal with print fluid channels, according to an example of the principles described herein.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In liquid electrophotography, a photo conductive surface may be charged and selectively exposed with a laser to form a charge pattern that corresponds to an image to be printed on the substrate. In some examples, the photo conductive surface is a photo conductive drum. In other examples, the photo conductive surface is a belt or other mechanism. The photo conductive surface, or PIP, may contact a number of developer units such as binary ink developers (BID) that selectively transfer a print fluid pattern to the charge pattern to form a pattern on the PIP corresponding to an image to be printed. The patterns may then be transferred from the PIP to an intermediate member. The intermediate member may then transfer the print fluid pattern to the substrate. In examples, the intermediate member may be, or be imposed upon, a drum. In another example, the intermediate member may be, or be imposed upon, a belt, e.g., a continuous belt.

The developer unit may be a replaceable unit that receives print fluid from a reservoir and transfers the print fluid to the PIP. The developer unit may include a developer roller that imparts a thin film of print fluid to a charged surface of the PIP. Print fluid that is not transferred to the PIP may be cleaned from the developer roller and recycled by various components of the developer unit. While these developer units provide an efficient mechanism to deliver print fluid to a PIP surface, certain characteristics of the developer unit may complicate its use.

For example, the developer unit may be an expensive component of the printing system and it is costly and ineffective to continually replace the developer units. Such developer units are prone to failure, which can lead to premature replacement which results in dissatisfied customers and unnecessary expenditures.

Specifically, each developer unit includes an interface between rotating components and a stationary end cap. A seal between these components prevents print fluid from spilling into the end cap. Leaks into the end cap can reduce the developer unit life, in some examples to less than 10% of the expected life of the developer unit. Over time, this interface between the rotating component and stationary end cap may see accelerated wear which can lead to the aforementioned undesirable leakage into the end cap.

This may be exacerbated due to the higher process speeds of new developer units. These higher speeds create greater friction forces at this interface and thereby increase wear at this rotating/stationary interface. Wear and/or failure at this interface may be due to inadequate lubrication and cooling of the sealing surface. The lack of lubrication may lead to the seal at the interface forming grooves on the roller. Print fluid may pass through these grooves into the end cap where they can either interfere with the operation of the developer unit or simply create a mess inside the developer unit, both of which are undesirable.

Accordingly, the present specification describes a seal that lubricates and cools this rotating/stationary interface to prevent the groove formation that can lead to leakage, performance reduction, and in some cases device failure. The present seal does so by introducing liquid at sealing surfaces. Accordingly, the present seal creates a pathway for print fluid to flow into and around the roller/end cap interface area, lubricating and cooling the sealing surfaces. This pathway is integrated into a seal, allowing the print fluid to be used as a coolant and lubricant before being returned for reuse in the developer unit. This lubrication and cooling effect prolong the lifespan of the developer unit by preventing leaks and abrasion at the roller/end cap interface.

Specifically, the seal includes a layer of foam adhered to a plastic-molded piece which contains channels for print fluid to travel between slots that correspond to the dynamic seal interfaces. These channels are sealed by the foam, creating routing from the higher-pressure inlet region to the area where the dynamic seal interacts with the roller journal. The print fluid from the higher-pressure inlet region is pushed into the cavity surrounding the dynamic seal, lubricating and cooling the sealing surface. Small channels in the downward-facing section of the plastic-molded piece allow this print fluid to drain into the developer unit tray, for reuse and remixing into the reservoir.

Specifically, the present specification describes a developer unit seal. The seal includes a first sealing member to contact an end cap of the developer unit. The first sealing member has ports to align with rollers that are to protrude into the end cap. The seal also includes a second sealing member to contact the first sealing member. The second sealing member has ports to align with the rollers. Channels are disposed between the first sealing member and the second sealing member to direct print fluid to each of the ports.

The present specification also describes a developer unit. The developer unit includes a housing unit to house a fluid reservoir, a number of rollers, and an end cap removably coupled to each end of the housing unit to rotatably support the number of rollers over the housing unit. Dynamic seals at each end of each roller prevent fluid from exiting the fluid reservoir. The developer unit also includes a seal per end cap to direct fluid from the fluid reservoir to the dynamic seals to lubricate an interface between the dynamic seals and the rollers.

The present specification also describes a developer unit. In this example, the developer unit includes a housing unit to house a fluid reservoir, a number of rollers, and an end cap removably coupled to each end of the housing unit to rotatably support the number of rollers over the housing unit. Dynamic seals are at each end of each roller to prevent fluid from entering the end cap. The developer unit also includes a fluid directing system per end cap to direct fluid from the fluid reservoir to the dynamic seals to lubricate an interface between the dynamic seals and the rollers.

Such systems and methods 1) cool the developer unit; 2) reduces developer unit leaks; 3) prevent wear on developer unit rollers; and 4) prolong developer unit expected life.

FIG. 1 is a block diagram of a developer unit seal (100), which seal (100) includes channels (104), according to an example of the principles described herein. As described above, if improperly lubricated, a dynamic seal between rollers of an developer unit and the support structure for the rollers may fail, which impacts performance of the developer unit as a whole. Accordingly, the seal (100) prevents such failure by providing print fluid, through channels (104), to the dynamic seal thus providing a cooling and lubricating effect to prolong the life of the rollers of the developer unit and to the developer unit as a whole.

Specifically, the seal (100) includes a first sealing member (102-1). The first sealing member (102-1) is to contact an end cap of the developer unit. This first sealing member (102-1) includes ports that align with the rollers which protrude into the end cap of the developer unit. The seal (100) also includes a second sealing member (102-2) to contact the first sealing member (102-1). This second sealing member (102-2) also includes ports to align with the rollers. In other words, the arrangement of the seal (100) is that the first sealing member (102-1) is sandwiched between the second sealing member (102-2) and the end cap. In some examples, the first sealing member (102-1) may be made of a rigid plastic material and the second sealing member (102-2) may be formed of a deformable material such as compressible foam, closed-cell foam, or plastic foam. Accordingly, the second sealing member (102-2) may compress between the first sealing member (102-1) and a body of the developer unit to ensure print fluid does not spill out from a designated area.

Disposed in the seal (100) are channels (104) to direct print fluid to each of the ports. That is, the rollers of a developer unit pass through ports in the first sealing member (102-1) and the second sealing member (102-2) On an end cap side of the seal (100) are dynamic seals which prevent print fluid from passing to the inside of the end cap, where it may impact performance of the rollers. The channels (104) between the ports thereby allow fluid to flow to the ports and interface with the respective seals. As described above, the print fluid acts as a cooling lubricant which prevents the grooving that can happen if the dynamic seals are not properly cooled or lubricated. In some examples, the channels (104) are formed in the sealing members (102) themselves. For example, three surfaces of the channels (104) may be formed in the first sealing member (102-1) with the fourth surface, or lid, of the channels (104) being formed as the first sealing member (102-1) is adhered to the second sealing member (102-2). In this way, the seal (100) provides for the delivery of print fluid to certain portions of a developer unit and cools and lubricates high friction areas. By so doing, the seal (100) prevents leakage and prolongs developer unit life.

Figure 2:
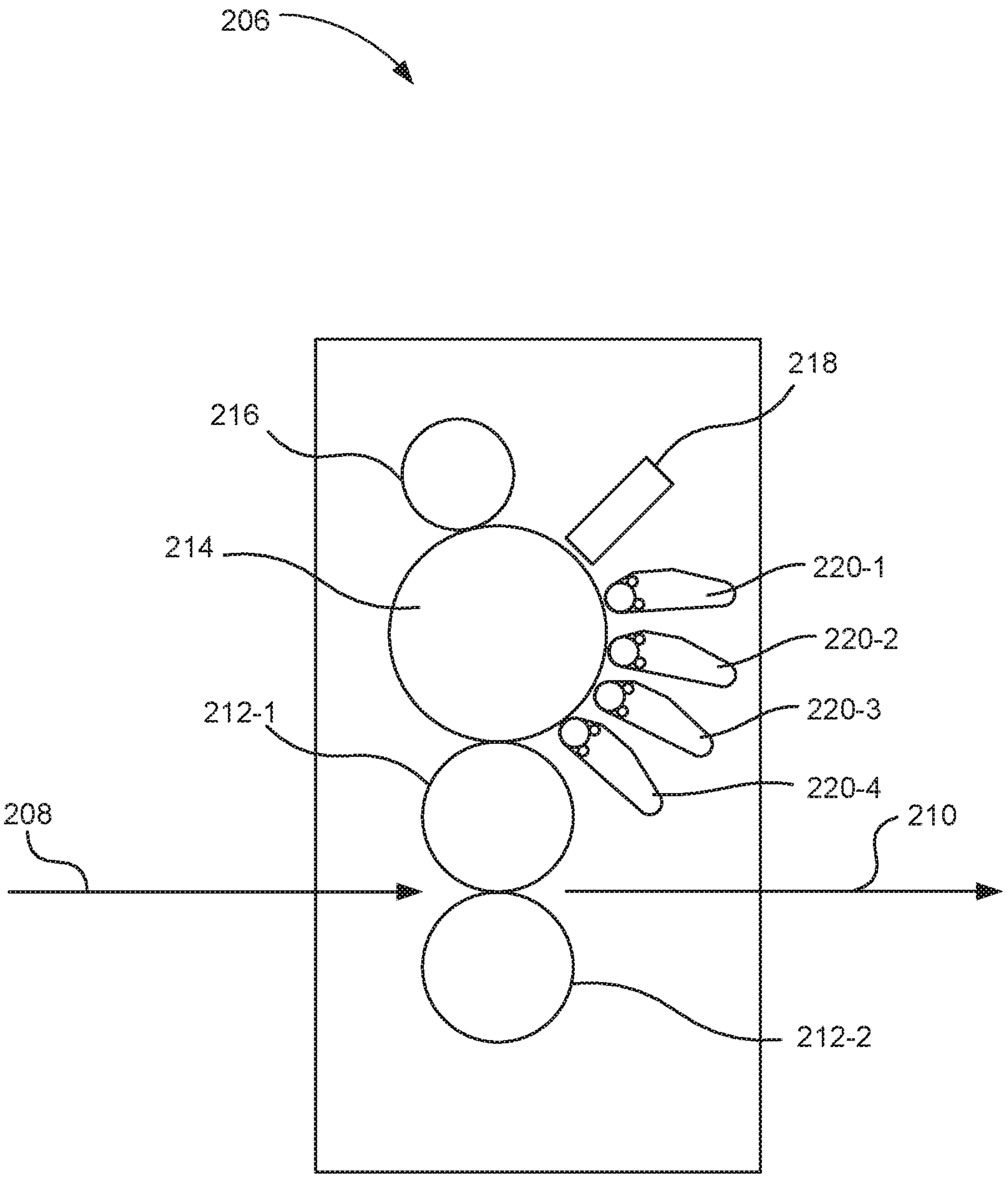
FIG. 2 is a diagram of a printing system with a developer unit that has seals with print fluid channels, according to an example of the principles described herein.

FIG. 2 is a diagram of a printing system (206) with a developer unit (220) that has seals (FIG. 1, 100) with print fluid channels (FIG. 1, 104), according to an example of the principles described herein. As described above, the printing system (206) may be used to deposit print fluid on a substrate such as paper. The print fluid may be of a variety of types including ink. The print fluid may be deposited in a pattern such as text or graphics. The system (206) may receive a substrate in a direction indicated by the arrow (208). The system (206) may then deposit print fluid in a pattern on to the substrate. The substrate may then exit the printing system (206) with the corresponding print fluid printed thereon, in a direction indicated by the arrow (210).

More specifically, the printing system (206) may include a number of application rollers (212) to transfer a patterned print fluid to the substrate. For example, a top application roller (212-1) may include print fluid in a pattern that is to be transferred to the substrate. The substrate may be pinched between the top application roller (212-1) and a bottom application roller (212-2) to ensure an even and thorough distribution of print fluid on the substrate. The top application roller (212-1) may receive the patterned print fluid from a photoelectric imaging plate (PIP) drum (214) on which the pattern may be formed. While FIG. 2 depicts a PIP drum (214), other PIP surfaces may be used such as a belt, conveyor; or other component.

The outer surface of the PIP drum (214) may be charged uniformly by a charging roller (216). A writing head (218) may then selectively discharge portions of the PIP drum (214) to create a pattern that corresponds to the image or text to be printed on the substrate, allowing print fluid to transfer to these areas from a developer roller of the developer units (220).

The developer unit (220) may apply print fluid to the charged surfaces of the PIP drum (214) to form an image that is to be transferred to the top application roller (212-1). As will be described in more detail below, the developer unit (220) may include sealed channels (FIG. 1, 104) to cool and lubricate certain components of the developer units (220). As described above, the developer units (220) may be removably coupled to the PIP drum (214). While FIG. 2 depicts four developer units (220), other numbers of developer units (220) may be implemented in accordance with the principles described herein.

Figure 3:
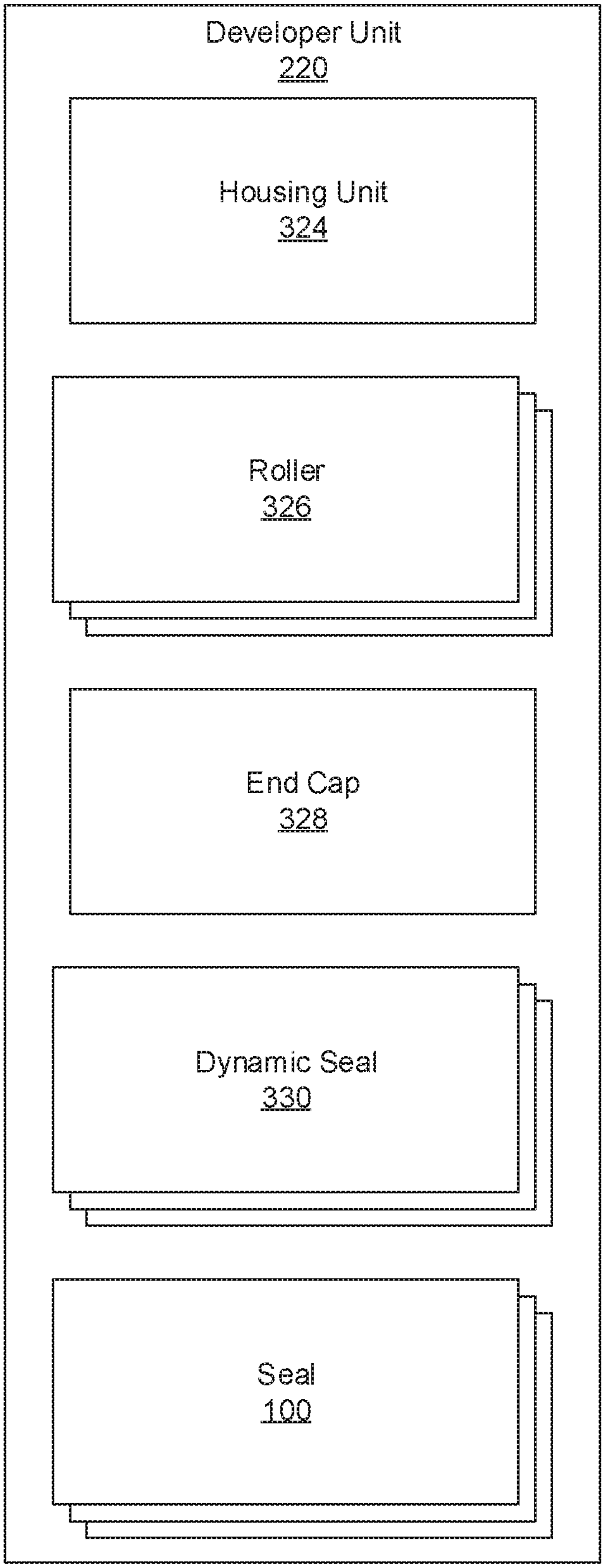
FIG. 3 is a block diagram of a developer unit that has seals with print fluid channels, according to an example of the principles described herein.

FIG. 3 is a block diagram of an developer unit (220) that has seals (100) with print fluid channels (FIG. 1, 104), according to an example of the principles described herein.

As described above, the developer unit (220) is a component of a printing system (FIG. 2, 206) that deposits print fluid of a particular type, i.e., a color, to a PIP surface, for example, a drum (FIG. 2, 214), in a particular pattern such that when multiple colors are deposited in respective patterns, an overall image and/or text is ultimately transferred to a substrate.

To achieve this functionality, each developer unit (220) includes various components. For example, each developer unit (220) includes a housing unit (324) to retain the print fluid, i.e., ink, to be deposited on the PIP surface. The developer unit (220) also includes a number of rollers (326) to facilitate the deposition process, and any subsequent process such as cleaning a developer roller of the developer unit (220). The rollers (326) are coupled to the developer unit (220) and allowed to rotate via end caps (328) at either end of the housing unit (324). Specifically, each end cap (328) is removably coupled to each end of the housing unit, translates energy to drive the rollers (326), and rotatably supports the number of rollers (326) over the housing unit (324).

As the end caps (328) do not rotate and the rollers (326) do, there is an interface where the rotating rollers (326) are coupled to the stationary end cap (328), at which interface friction between the relative surfaces exist. Dynamic seals (330) at ends of each roller (326) support the rollers (326) and prevent fluid from exiting the fluid reservoir. That is, fluid resides in a reservoir in the housing unit (324) and is provided to the rollers (326). However, it may be undesirable to allow this fluid to enter the end caps (328) where mechanical mechanisms for rotating the rollers (326) reside. That is, the dynamic seals (330) ensure that the print fluid remains in the reservoir and between the reservoirs/rollers (326) and does not enter into the end cap (328) where it can negatively impact operation of components found within the end cap (328).

However, as described above, these dynamic seals (330) see a lot of friction due to the motion of the rollers (326) and the lack of movement of the dynamic seal (330). If left unchecked, the constant friction and heat generated therefrom may negatively impact the operation of the developer unit (220). Specifically, the dynamic seals (330) may dig into the roller (326) shafts, creating a point where fluid may enter the end cap (328), which as described above is undesirable. Accordingly, the developer unit (220) includes a seal (100) per end cap (328) to direct fluid from the fluid reservoir to the dynamic seals (330) to cool them. That is, the fluid lubricates the interface between the dynamic seals (330) and the rollers (326) to prevent excess heat buildup that leads to developer unit (220) failure.

Such a seal (100) includes the first sealing member (FIG. 1, 102-1), second sealing member (FIG. 1, 102-2), and channels (FIG. 1, 104) to direct fluid to the dynamic seal (330)/roller (326) interface.

Figure 4:
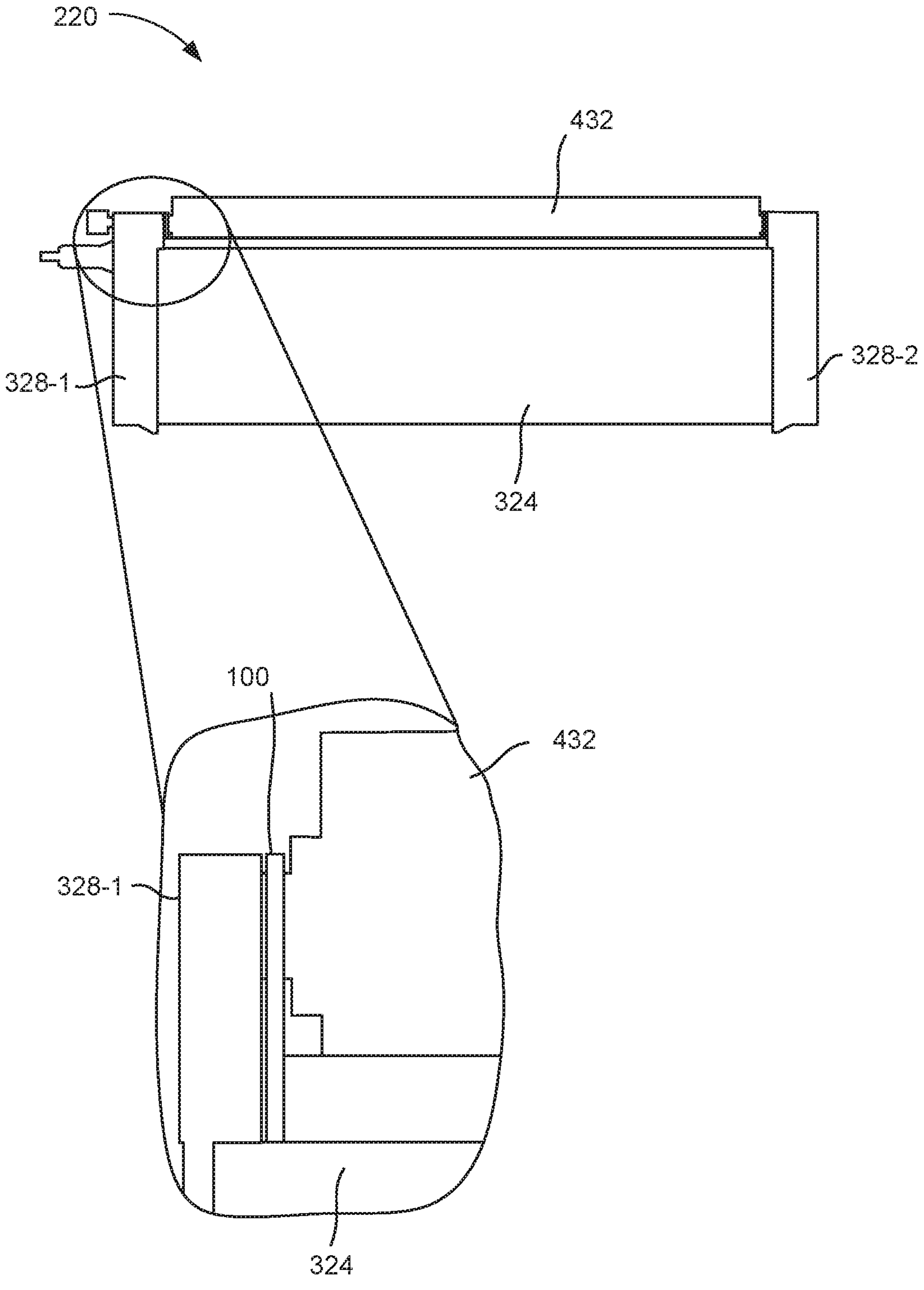
FIG. 4 is a diagram of a developer unit that has seals with print fluid channels, according to an example of the principles described herein.

FIG. 4 is a side view of a developer unit (220) that has seals (FIG. 1, 100) with print fluid channels (FIG. 1, 104), according to an example of the principles described herein. FIG. 4 clearly depicts the two end caps (328-1, 328-2) that are disposed on either end of the housing unit (324) which supports a number of rollers (FIG. 3, 326). The number of rollers (FIG. 3, 326) may include a developer roller (432). The developer roller (432) may transfer a film of print fluid to a PIP surface of a printing system (FIG. 2, 206). For example, the developer roller (432) may receive charged and pressurized print fluid from a reservoir of the developer unit (220). The charged print fluid on the developer roller (432) may be attracted and transferred to the charged portions of the PIP surface that correspond to an image to be printed. The print fluid may be transferred to the substrate via the application rollers (FIG. 2, 212). The print fluid on the developer roller (432) may pass by a squeegee roller which regulates the thickness of the film on the developer roller (432). Due to the operation of the squeegee roller, a film of uniform thickness may be applied to the PIP surface.

The developer unit (220) may also include a number of seals (100), that are removably coupled to a respective end cap (328). For example, a first seal (100-1) may be used on a first end of the developer unit (220) and a second seal (not shown) may be used on a second end of the developer unit (220). As described above, the seals (100) direct fluid to the dynamic seals (FIG. 3, 330) to cool and lubricate the respective dynamic seal (FIG. 3, 330)/roller (FIG. 3, 326) interfaces.

As described above and as indicated in the zoomed-in portion of FIG. 4, the seal (100) may be placed between a developer roller (432) and a respective end cap (328-1). The seal (100) may form a seal between the end cap (328-1) and various rollers.

Figure 5:
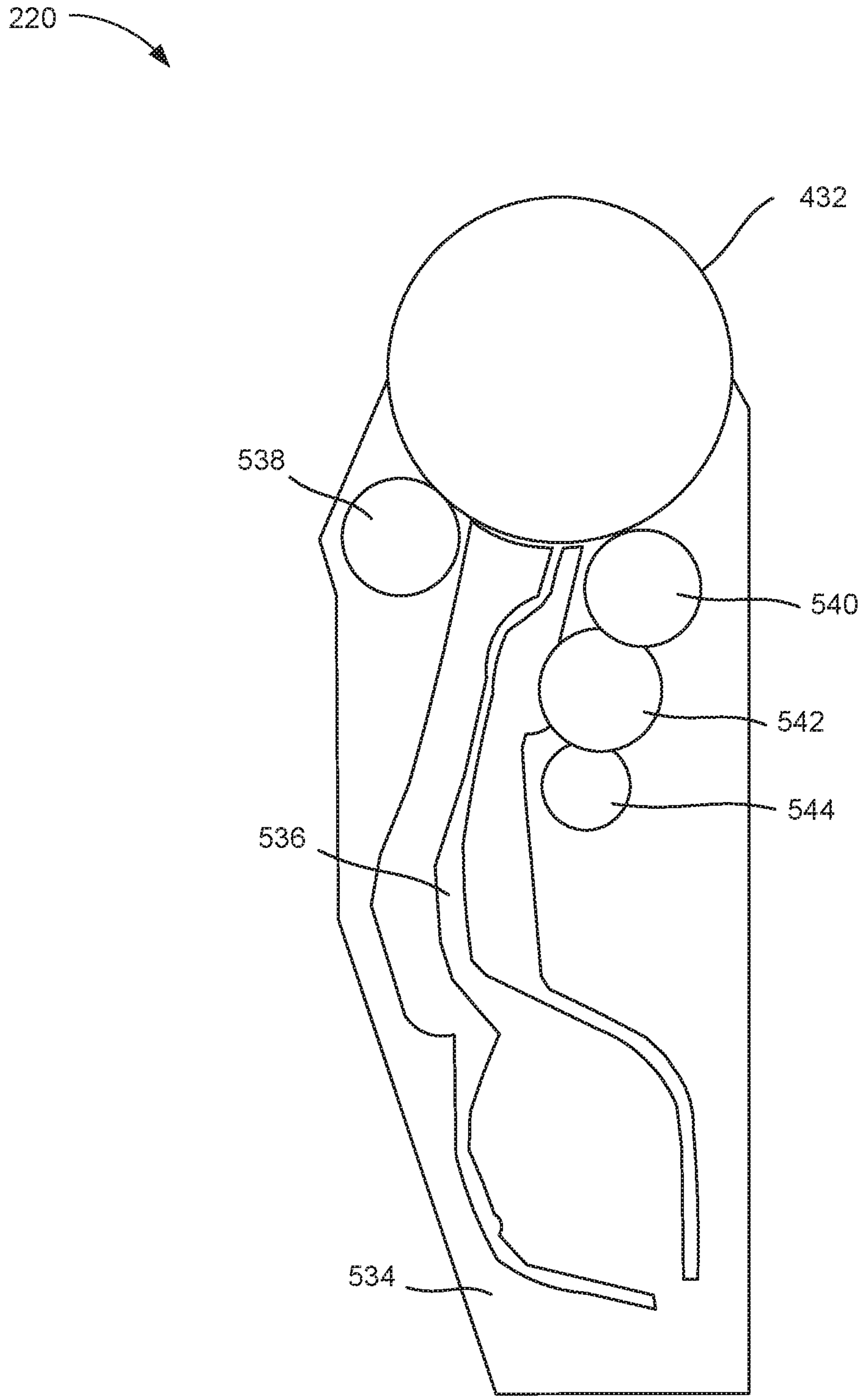
FIG. 5 is a cross sectional view of a developer unit that has seals with print fluid channels, according to an example of the principles described herein.

FIG. 5 is a cross sectional view of a developer unit (220) that has seals (FIG. 1, 100) with print fluid channels (FIG. 1, 104), according to an example of the principles described herein. Specifically, FIG. 5 depicts a cross-section of the housing unit (FIG. 3, 324) with the end cap (FIG. 3, 328) and seal (FIG. 1, 100) omitted for clarity.

In FIG. 5, the developer roller (432) body may extend into the page. The print fluid may reside in a reservoir (534) of the developer unit (220). In one particular example, the print fluid passes through an inlet (536) to the developer roller (432) where it may be transferred to the PIP drum (FIG. 2, 214). Excess print fluid may flow down into the reservoir (534) where it may remix with bulk print fluid. As described above, the oppositely charged print fluid may be attracted to, and be transferred to, the developer roller (432). As described above, the developer unit (220) may include a number of other rollers to aid in print fluid delivery. Specifically, a squeegee roller (538) may regulate the film thickness on the developer roller (432). The developer roller (432) may then transfer the film to the PIP drum (FIG. 2, 214). Excess print fluid that is not transferred to the PIP drum (FIG. 2, 214) may be cleaned off the developer roller (432) by the cleaner roller (540). A sponge roller (542) may then absorb print fluid from the cleaner roller (540). A squeezer roller (544) may squeeze the excess print fluid out of the foam sponge roller (542). The cleaner roller (540), sponge roller (542), and squeezer roller (544) allow the print fluid to be recycled and also reduce the buildup of sludge within the developer unit (220). While FIG. 5 depicts a particular configuration of rollers (FIG. 3, 326), other configurations may exist as well with any number of different rollers.

Figure 6:
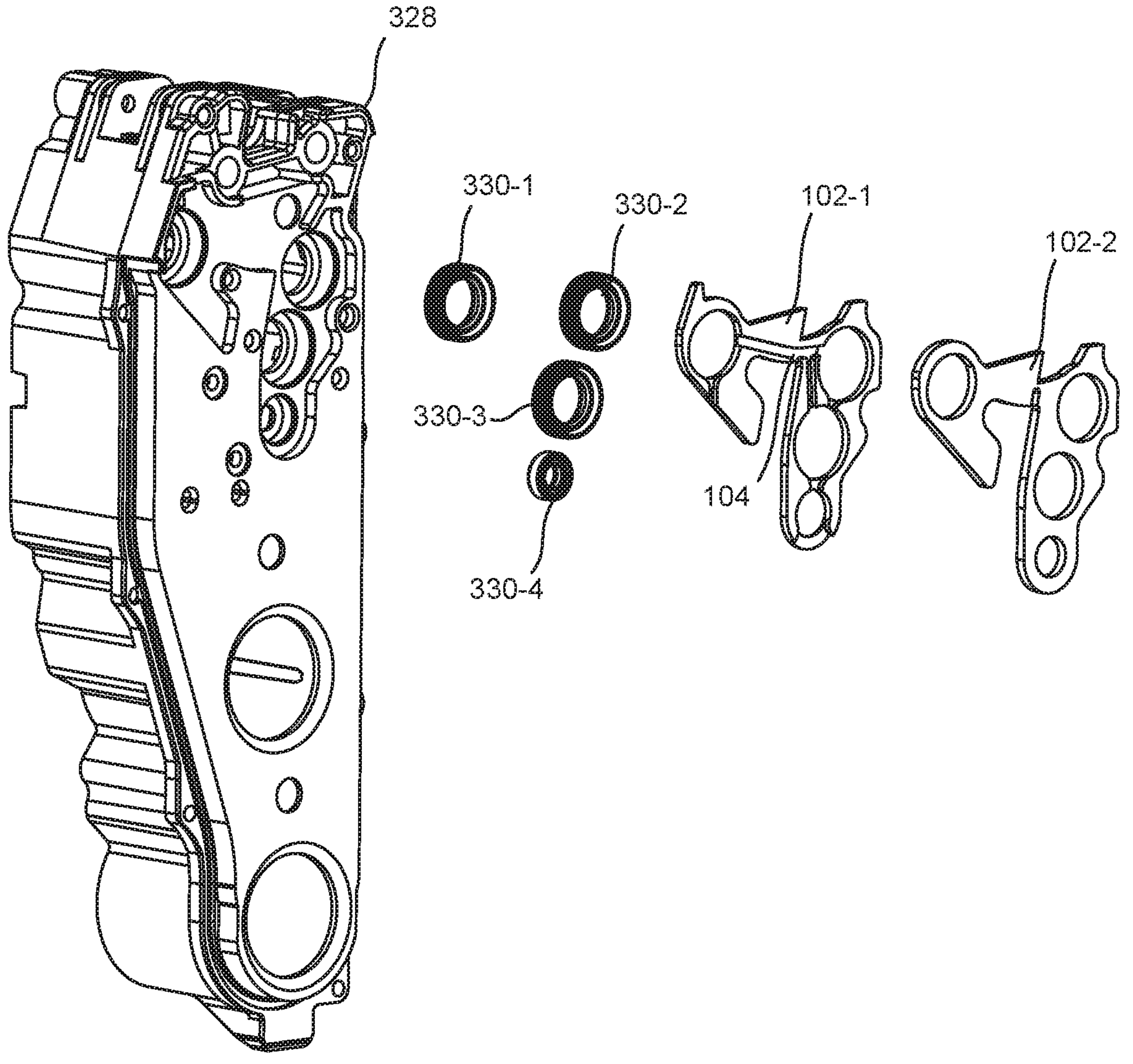
FIG. 6 is an exploded view of a developer unit seal with print fluid channels, according to an example of the principles described herein.

FIG. 6 is an exploded view of a developer unit seal (FIG. 1, 100) with print fluid channels (104), according to an example of the principles described herein. FIG. 6 clearly depicts the end cap (328) and the dynamic seals (330) that surround various rollers (FIG. 3, 326) of the developer unit (FIG. 2, 220). While FIG. 6 depicts four dynamic seals (330-1, 330-2, 330-3, 330-4) for four rollers (FIG. 3, 326), the seal (FIG. 1, 100) may include any number of ports for any number of rollers (FIG. 3, 326). In this particular example, four rollers (FIG. 3, 326) of the developer unit (FIG. 2, 220) are sealed by the dynamic seals (330). Given that each developer unit (FIG. 2, 220) includes two end caps (328), a developer unit (FIG. 2, 220) implementing the seal (FIG. 1, 100) depicted in FIG. 6 would include eight dynamic seals (330).

FIG. 6 also depicts the seal (FIG. 1, 100) which includes two sealing members (102-1, 102-2). FIG. 6 also clearly depicts the ports that align with the rollers (FIG. 3, 326) that are to protrude through the seal (100) and dynamic seals (330) to be rotatably supported and driven through the end cap (328).

Figure 7:
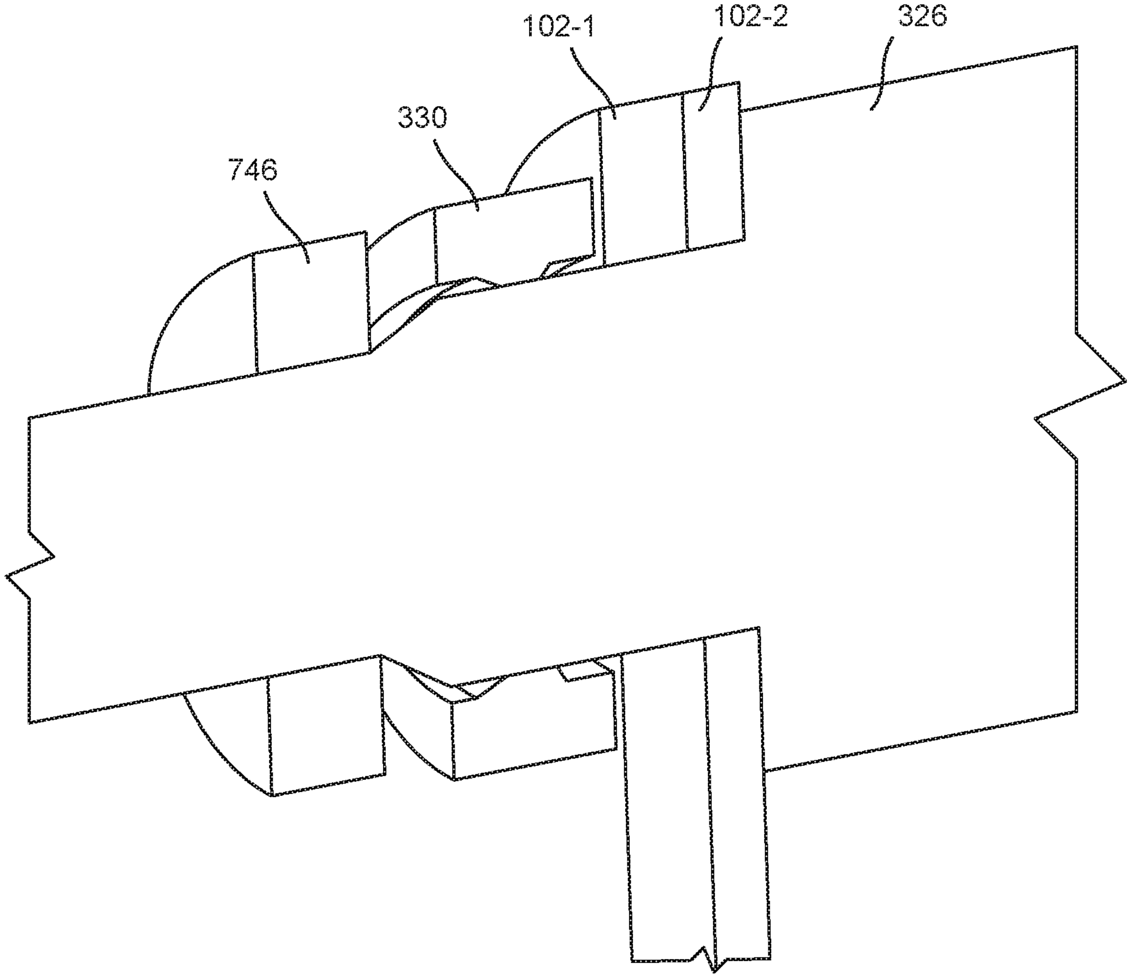
FIG. 7 is a cross sectional view of a portion of a developer unit that has seals with print fluid channels, according to an example of the principles described herein.

FIG. 7 is a cross sectional view of a portion of a developer unit (FIG. 2, 220) that has seals (FIG. 1, 100) with print fluid channels (FIG. 1, 104), according to an example of the principles described herein. Specifically, FIG. 7 depicts a roller (326) as it is rotatably supported by a bearing (746), which bearing (746) may be disposed in an end cap (FIG. 3, 328). As described above, the dynamic seal (330) via an interface with the roller (326) prevents fluid from entering the end cap (FIG. 3, 326) and interfering with the operation of components therein such as the bearing (746) and others. For example, the print fluid may contaminate the bearing (746), affecting its ability to rotatably support any associated roller (326). A faulty bearing (746) may impact the performance of the associated roller (326), thereby affecting the associated developer unit (FIG. 2, 220) from performing its intended operation to a satisfactory level. Specifically, faulty bearings (746) may cause print quality issues and lead to an overall expected failure much earlier than anticipated.

Moreover as described above, if improperly lubricated, the contact point between the dynamic seal (330), which may be a polyurethane material, and the roller (326), which may be a metallic material, may result in accelerated wear of the roller (326) such that a tight seal is not formed between these two components. Deterioration of this interface provides an entry point into the end cap (FIG. 3, 328) of unwanted fluid. Accordingly, the seal (FIG. 1, 100), which includes the first sealing member (102-1) which includes print fluid channels (FIG. 1, 104) and the second sealing member (102-2), provides print fluid to the dynamic seal (330). This print fluid lubricates and cools the interface preventing the wearing down of the roller (326), thus reducing the likelihood of print fluid entry into the end cap (FIG. 3, 328) that can result due to overheating of the interface.

Figure 8:
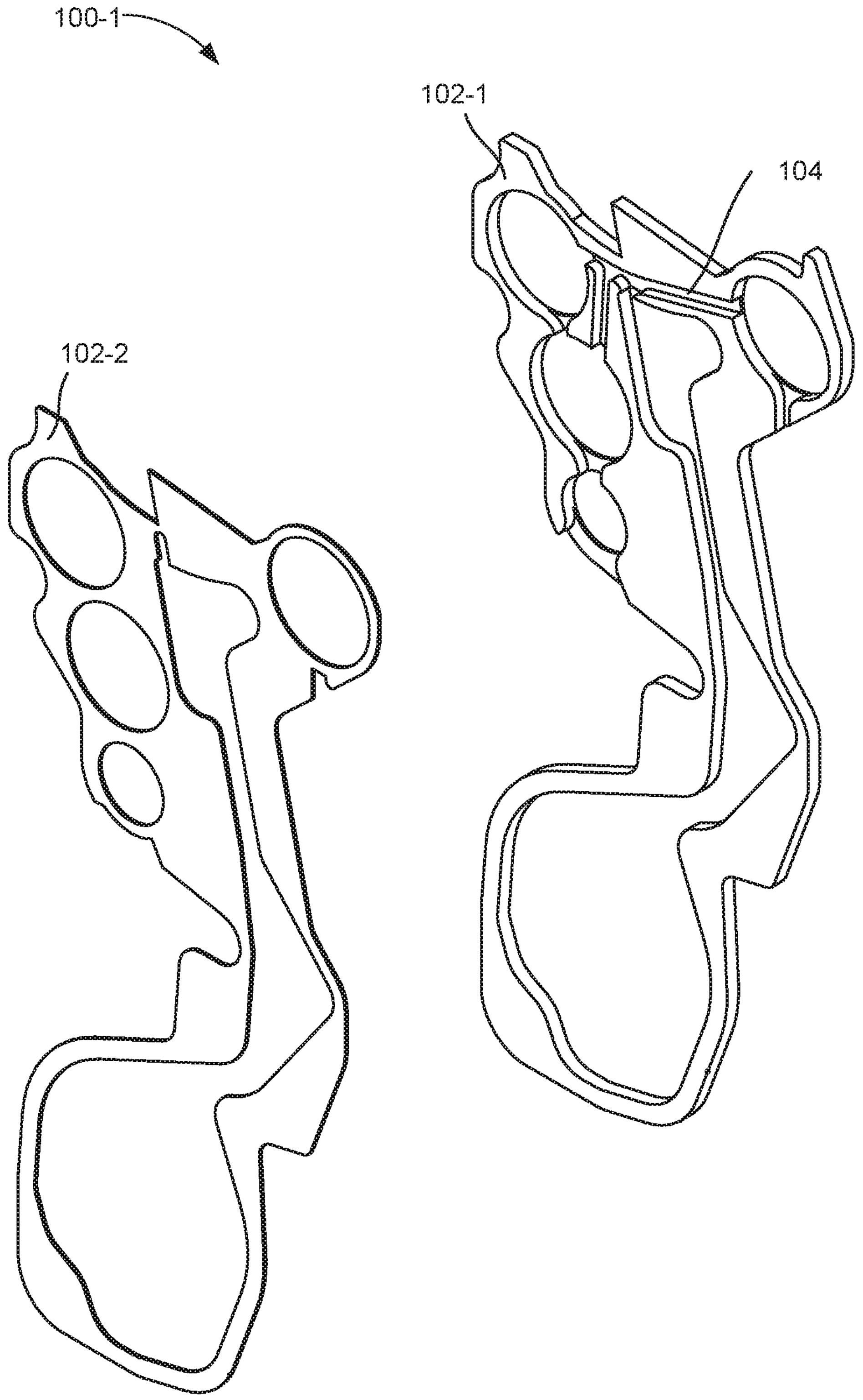
FIG. 8 is an isometric diagram of a developer unit seal with print fluid channels, according to an example of the principles described herein.

FIG. 8 is an isometric diagram of a developer unit seal (100-1) with print fluid channels (104), according to an example of the principles described herein. As described above, the seals (100) are placed at either end of a developer unit (FIG. 2, 220). In some examples, the seals (100) have a different profile from one another. For example, a first seal (100-1) depicted in FIG. 8 has one profile, with a portion of a seal (100-1) to surround the inlet (FIG. 5, 536). By comparison, a second seal (100-2) depicted in FIG. 9 has a different profile that does not surround the inlet (FIG. 5, 536) as the inlet (FIG. 5, 536) may be just on one side of the developer unit (FIG. 2, 220).

FIG. 8 also clearly depicts the first sealing member (102-1) which may be formed of a rigid plastic material and the second sealing member (102-2) which may be formed of a deformable material, such as a closed-foam cell. While different seals (100) may have different shapes as described above, the sealing members (102) themselves may have the same shape. Each sealing member (102) includes ports that align with the rollers (FIG. 3, 326) that protrude therethrough to be rotatably supported by the end cap (FIG. 3, 328) as depicted in FIG. 7 via the bearings (FIG. 7, 746).

Figure 10:
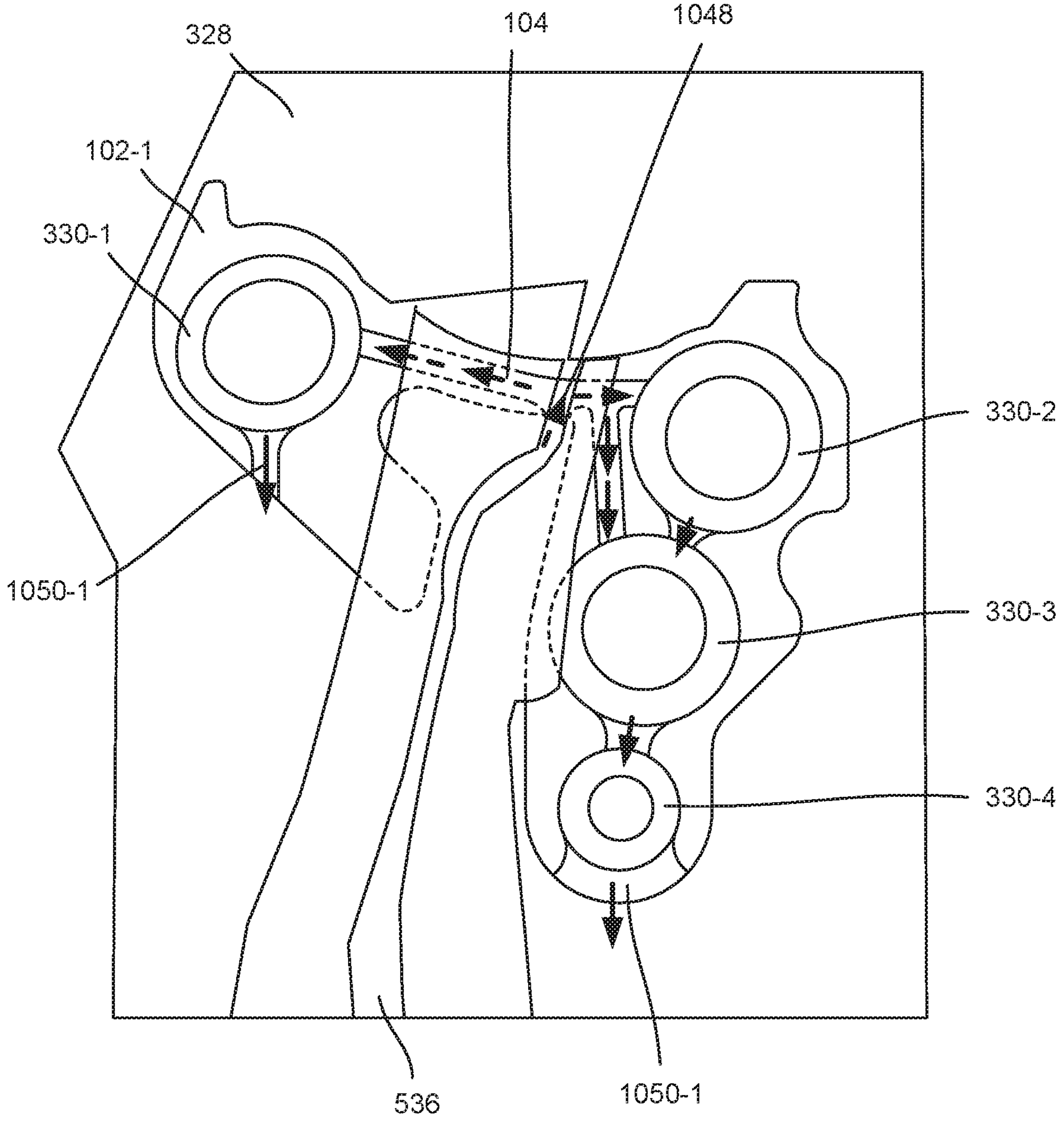
FIG. 10 is a front view of a fluid delivery system of a developer unit, according to an example of the principles described herein.

FIG. 8 also clearly depicts the channels (104) that allow print fluid to flow to areas surrounding the dynamic seals (FIG. 3, 330) and thereby to cool and lubricate those dynamic seal (FIG. 3, 330)/roller (FIG. 3, 326) interfaces. An example fluid path through the channels (104) is depicted in FIG. 10. The channels (104) may be formed in any number of ways including, for example, during the injection mold process where the first sealing member (102-1) is formed or in a subsequent etching process.

When joined together, the first sealing member (102-1) and the second sealing member (102-2) form the channels (104). That is, three walls of the channels (104) may be formed in the first sealing member (102-1). The second sealing member (102-2), when adhered or placed adjacent to the first sealing member (102-1), defines a lid, or fourth wall, of the channel (104).

Figure 9:
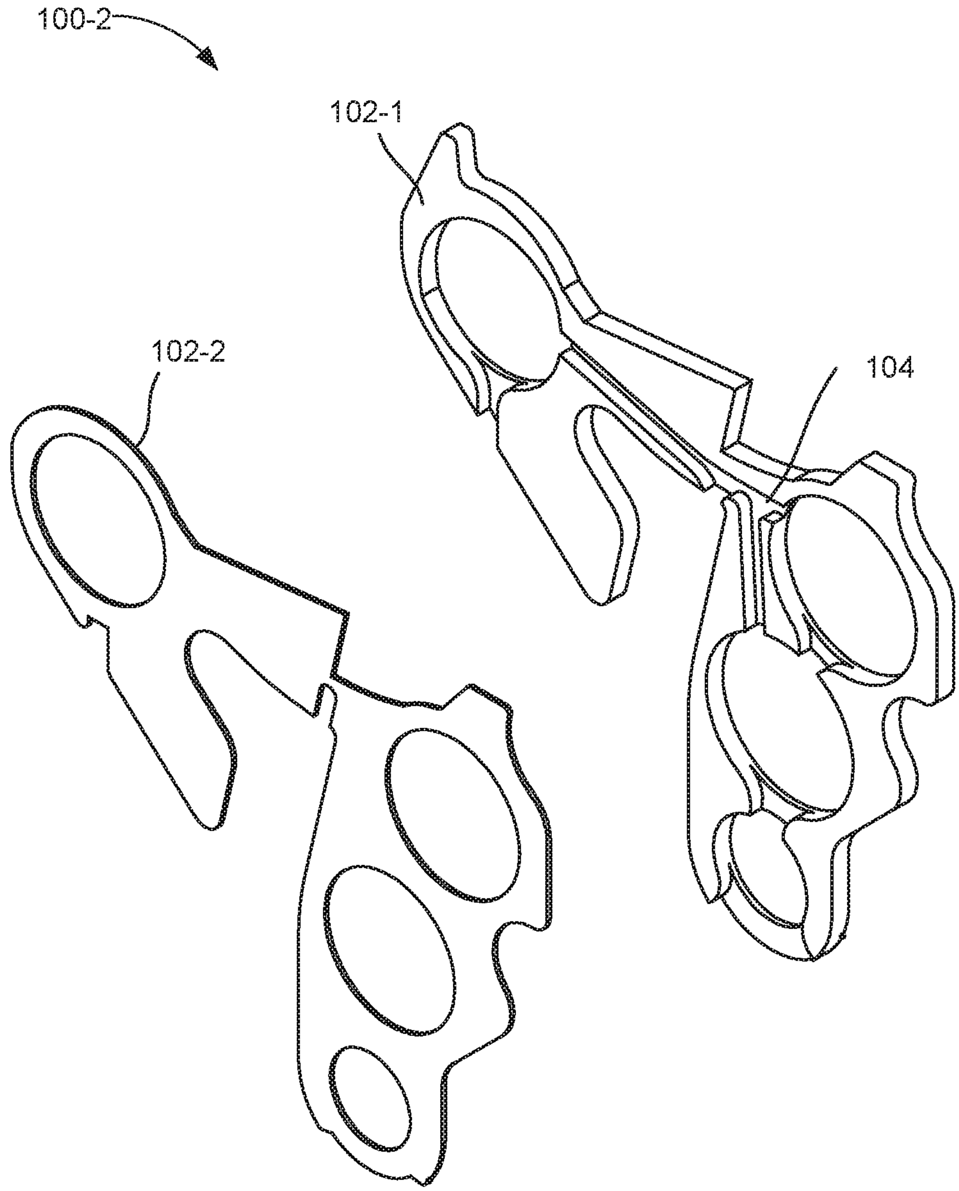
FIG. 9 is an isometric diagram of a developer unit seal with print fluid channels, according to an example of the principles described herein.

FIG. 9 is an isometric diagram of a developer unit seal (100-2) with print fluid channels (104), according to an example of the principles described herein. As described above, the seals (100) may have a different profile from one another. For example, the second seal (100-2) depicted in FIG. 9 has a different profile that does not surround the inlet (FIG. 5, 536) as the inlet (FIG. 5, 536) may be just on one side of the developer unit (FIG. 2, 220).

FIG. 9 also clearly depicts the first sealing member (102-1) which may be formed of a rigid plastic material and the second sealing member (102-2) which may be formed of a deformable material, such as a closed-foam cell. While different seals (100) may have different shapes as described above, the sealing members (102) themselves may have the same shape.

FIG. 9 also clearly depicts the channels (104) that allow print fluid to flow to areas surrounding the dynamic seals (FIG. 3, 330) and thereby to cool and lubricate those dynamic seal (FIG. 3, 330)/roller (FIG. 3, 326) interfaces. An example fluid path through the channels (104) is depicted in FIG. 10.

When joined together, the first sealing member (102-1) and the second sealing member (102-2) form the channels (104). That is, three walls of the channels (104) may be formed in the first sealing member (102-1). The second sealing member (102-2), when adhered or placed adjacent to the first sealing member (102-1), defines a lid of the channel (104).

FIG. 10 is a front view of a fluid delivery system of a developer unit (FIG. 2, 220). That is, in some examples, the developer unit includes a fluid directing system per end cap (328). This fluid delivery system directs fluid from a reservoir (534) to the dynamic seals (330) to lubricate an interface between the dynamic seals (330) and the corresponding rollers (FIG. 3, 326). This fluid delivery system may take many forms. For example, the fluid delivery system may include the developer unit seal (FIG. 1, 100) with print fluid channels (104), according to an example of the principles described herein. Specifically, FIG. 10 depicts the seal (FIG. 1, 100) in place against the end cap (328) and with the dynamic seals (330-1, 330-2, 330-3, 330-4) in place. For simplicity in FIG. 10, the second sealing member (FIG. 1, 102-2) is omitted from view so as to depict the channels (104) and flow path of the print fluid through the channels (104) in the seals (FIG. 1, 100).

Specifically, the seal (FIG. 1, 100) may have an input channel (1048) to receive fluid from the inlet (536). Note that as depicted in FIG. 10, portions of the sealing member (102-1) are depicted in dashed line to indicate their position behind the inlet (536). That is, the sealing member (102) and the corresponding seal (FIG. 1, 100) are sandwiched between the end cap (328) and the housing (FIG. 3, 324) of the developer unit (FIG. 2, 220), of which the inlet (536) is a part.

As depicted in FIG. 10, there may be a single inlet channel (1048). From that single inlet channel (1048), fluid is directed to the different dynamic seals (330) as indicated by the arrows in FIG. 10. As depicted in FIG. 10, in some examples, at least one channel (104) is disposed between adjacent ports. For example, channels (104) may be formed between a second dynamic seal (330-2) and a third dynamic seal (330-3) and a fourth dynamic seal (330-4). In these examples, fluid does not come directly from the inlet (536) but indirectly via other channels (104).

The channels (104) also include at least one outlet channel (1050-1, 1050-2) to deliver excess fluid to a reservoir (FIG. 5, 534) of the developer unit (FIG. 2, 220). That is, as described above, fluid may be recycled for use in printing or for subsequent cooling and lubrication. The outlet channels (1050) deliver excess fluid back to a bulk reservoir (FIG. 5, 534) where it can be recycled for various purposes.

Accordingly, the seal (FIG. 1, 100) and sealing members (102) with channels (104) as described in the present specification elongate the life of the developer unit (FIG. 2, 220) by lubricating certain areas where high friction is seen, which high friction can lead to leaks and affect the performance of certain components, such as bearings (FIG. 7, 746) that allow the rollers (FIG. 3, 326) of the developer unit (FIG. 2, 220) to carry out their intended functions.

Such systems and methods 1) cool the developer unit; 2) reduces developer unit leaks; 3) prevent wear on developer unit rollers; and 4) prolong developer unit expected life.

What is claimed is:

1. A developer unit seal, the seal comprising:
a first sealing member to contact an end cap of the developer unit, the first sealing member having ports to align with rollers that are to protrude into the end cap;
a second sealing member to contact the first sealing member, the second sealing member having ports to align with the rollers; and
channels formed by the first sealing member and the second sealing member to direct print fluid to lubricate each of the ports,
wherein three walls of the channels are formed in the first sealing member and the second sealing member defines a fourth wall of the channels.

2. The seal of claim 1, wherein:
the first sealing member is formed of plastic; and
the second sealing member is formed of a deformable foam.

3. The seal of claim 1, wherein the first sealing member and the second sealing member have the same shape.

4. The seal of claim 1, wherein the channels comprise a single inlet channel to receive fluid from an inlet.

5. The seal of claim 1, wherein at least one of the channels is disposed between adjacent ports.

6. The seal of claim 1, wherein the channels comprise at least one outlet channel to deliver excess print fluid to a reservoir of the developer unit.

7. A developer unit comprising:
a housing unit to house a fluid reservoir;
a number of rollers;
an end cap removably coupled to each end of the housing unit to rotatably support the number of rollers over the housing unit;
dynamic seals at each end of each roller to prevent fluid from exiting the fluid reservoir; and
a seal per end cap having a first sealing member in contact with a second sealing member forming channels to direct fluid from the fluid reservoir to the dynamic seals to lubricate an interface between the dynamic seals and the rollers,
wherein three walls of the channels are formed in the first sealing member and the second sealing member defines a fourth wall of the channels.

8. The developer unit of claim 7,
wherein the first sealing member contacts an end cap of the developer unit, the first sealing member further having ports to align with rollers that are to protrude into the end cap;
wherein the second sealing member has ports to align with the rollers;
an inlet channel to receive fluid;
wherein the channels are disposed between the ports to direct print fluid to each of the ports; and
an outlet to deliver excess fluid to the fluid reservoir.

9. The developer unit of claim 8, wherein:
the first sealing member is formed of plastic; and
the second sealing member is formed of a closed-cell foam.

10. The developer unit of claim 7, wherein a first seal is disposed at one end of the developer unit and a second seal is disposed at another end of the developer unit.

11. The developer unit of claim 10, wherein the first seal has a different profile than the second seal.

12. The developer unit of claim 11, wherein the first seal surrounds at least in part an inlet of the developer unit.

13. A developer unit comprising:
a housing unit to house a fluid reservoir;
a number of rollers;
an end cap removably coupled to each end of the housing unit to rotatably support the number of rollers over the housing unit;
dynamic seals at each end of each roller to prevent fluid from entering the end cap; and
a fluid directing system per end cap to direct fluid from the fluid reservoir to the dynamic seals to lubricate an interface between the dynamic seals and the rollers, wherein the fluid direction system includes a first sealing member in contact with a second sealing member to form channels to direct the fluid.

14. The developer unit of claim 13, wherein each fluid directing system is removably coupled to a respective end cap.

* * * * *